F. E. & A. L. ROLLINS.
CAR STAKE.
APPLICATION FILED APR. 13, 1910.
1,001,690.
Patented Aug. 29, 1911.
2 SHEETS—SHEET 2.
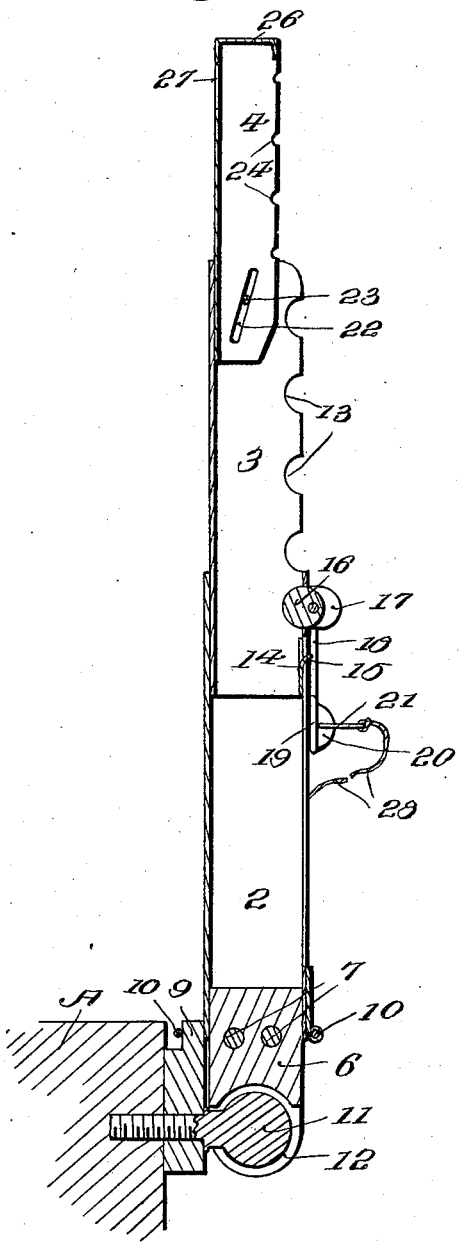
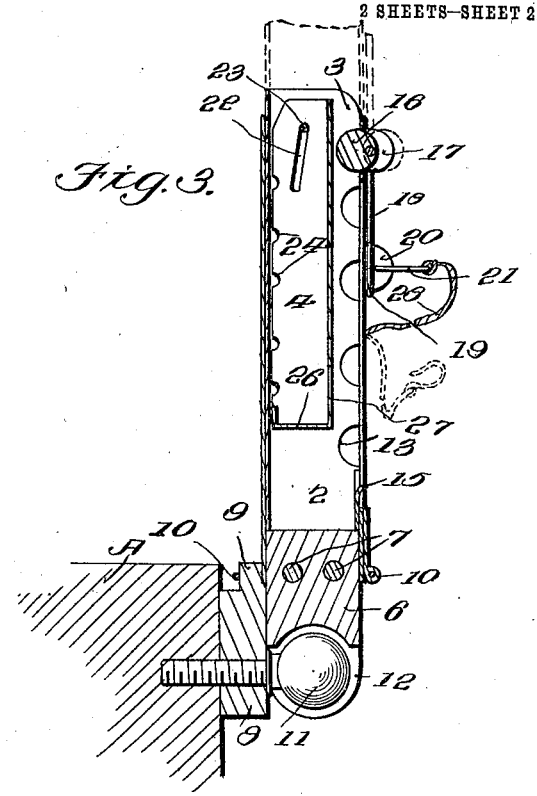
Witnesses
Inventor
F. E. Rollins
A. L. Rollins.
By Attorneys
COLUMBIA PLANOGRAPH CO., WASHINGTON, D. C.

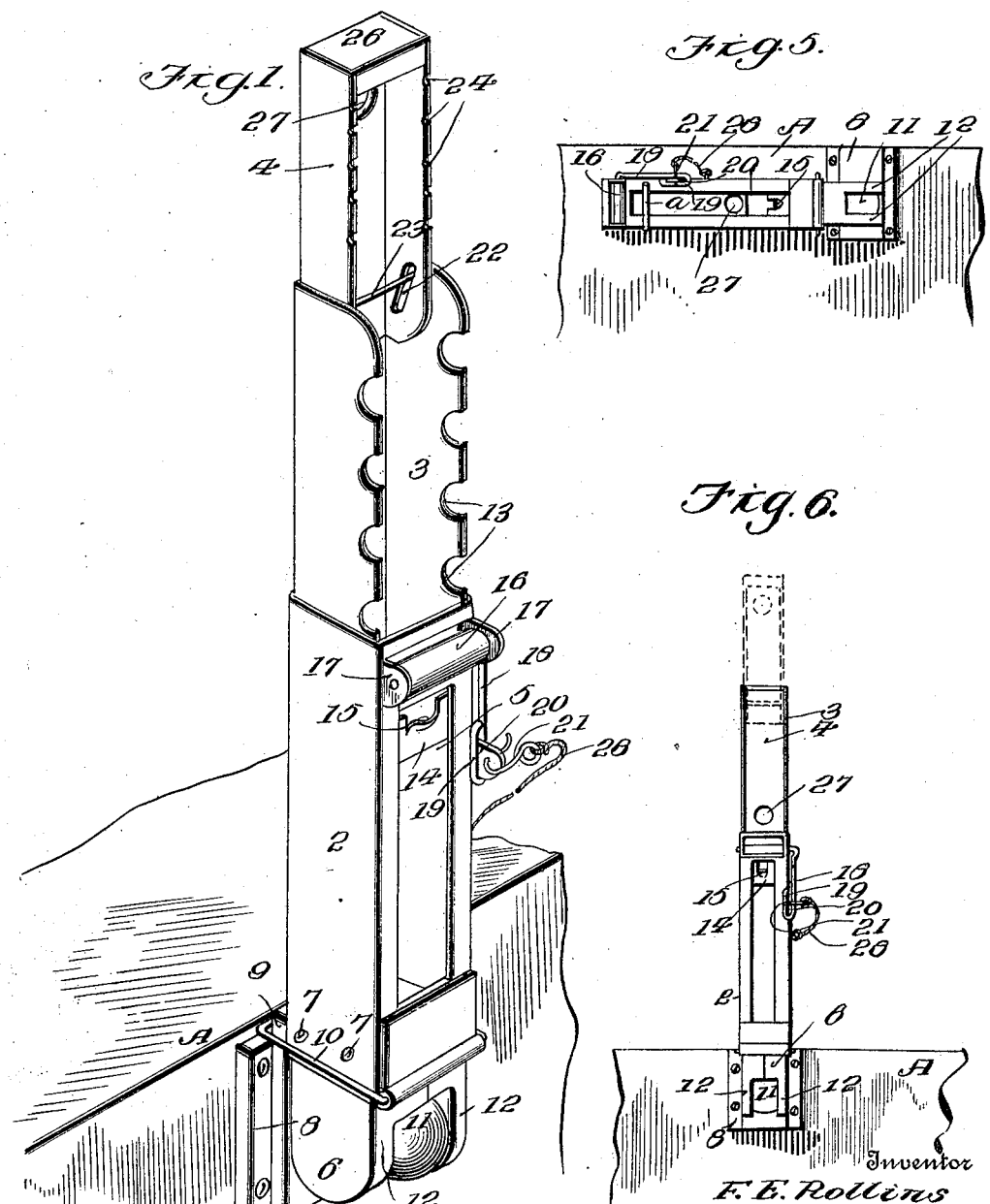

UNITED STATES PATENT OFFICE.

FRANK E. ROLLINS AND ARVIN L. ROLLINS, OF MATTOON, WISCONSIN.

CAR-STAKE.

1,001,690.  Specification of Letters Patent.  Patented Aug. 29, 1911.

Application filed April 13, 1910.  Serial No. 555,127.

*To all whom it may concern:*

Be it known that we, FRANK E. ROLLINS and ARVIN L. ROLLINS, citizens of the United States, residing at Mattoon, in the county of Shawano and State of Wisconsin, have invented certain new and useful improvements in Car-Stakes, of which the following is a specification.

Our invention relates to car stakes such as are attached to the sides of flat cars and projecting up therefrom in order to hold material thereon, the object of the invention being to provide a car stake which is foldable or telescopic, and which may be changed as desired, and which is also so connected to the side of the car that it may be turned either at right angles to the car or extending parallel to the length of the same, or dropped to a horizontal position.

The invention consists in a car stake having a body portion which is composed of telescopic or folding sections, and which is attached to the side of the car by a universal joint permitting the stake to be raised to a vertical position, dropped to a horizontal position, or turned so as to lie along the side of the car below the upper edge of the same and be supported in this position.

The invention is shown in the accompanying drawings, wherein:—

Figure 1 is a perspective view of our improved car stake in its extended position. Fig. 2 is a longitudinal vertical section of the stake in its extended vertical position. Fig. 3 is a horizontal vertical section similar to Fig. 2 but showing the stake collapsed. Fig. 4 is a horizontal section through the ball and socket joint. Fig. 5 is a side elevation of a portion of a car still showing the stake collapsed and supported horizontally. Fig. 6 is a front elevation showing the stake raised to a vertical position and two of the sections extended.

Corresponding and like parts are referred to in the following description and indicated in all the views of the accompanying drawings, by the same reference characters.

Referring to these figures it will be seen that our improved stake comprises a lower section 2, a middle section 3, and an uppermost section 4. The lower section is rectangular in cross section, but formed with a longitudinally extending slot 5 on its outer face. The lower end of this section is attached to one member 6 of a universal joint, this member being formed in two sections engaged with each other in any suitable manner, and inserted into the lower end of the section 2 and bolted thereto by bolts 7. Attached to the sill of the car is the casting 8 having on its upper side the upwardly projecting lug 9. Pivotally mounted on the front face of the section 2, at the base thereof, is a latch 10 which has the form of a bail and which, when the car stake is in an upright position is adapted to engage over the upwardly projecting lug 9 so as to hold the stake in a vertical position. The latch may be lifted, however, in which case the car stake is released from its fixed position relative to the car sill and may be turned outwardly to any desired position. Projecting out from the casting 8 is the other member of a universal joint, viz., the ball and knuckle 11 upon which the member 6 fits and with which it engages. The two inside faces of the downwardly projecting portions 12 of the members 6 are hollowed out for the reception of this ball. It will thus be seen that the car stake at its lower end is mounted upon a universal joint which permits the stake to be turned down either parallel with the car, outwardly therefrom, depending from the car sill, or upwardly extended. When the stake is in the position parallel to the sill of the car it is supported in a hooked arm *a* which projects from the car sill A.

Telescopically mounted inside of section 2 is the intermediate section 3. This is preferably made of angle iron, U-shaped in section and is adapted to fit sufficiently snugly within the section 2 so that while the section 3 may move in the section 2 it shall not have any lateral play. The forward edge of the section 3 is provided with notches 13, and the lower portion of section 3 has a crossbar 14 provided with an outwardly projecting lip 15 by which the intermediate section may be lifted or lowered by hand. The upper end of the section 2 is provided with a latch for engaging the section 3 so as to hold it in any desired vertically adjusted position. The form of latch which we have shown and which we believe to be the most effective in practice consists of an eccentric 16 which is mounted in ears 17 projecting from the upper end of the lower section 2. The eccentric 16 is pivotally mounted in these ears and at one end is provided with an arm 18 having a loop 19 formed at its end. This loop 19 is adapted to engage with a lug or ear 20 projecting from the side of the section 2 in such position as to be engaged by the loop 19 when the arm 18 is turned down parallel to the face of the lower section. In this position the eccentric 16 engages in the notches 13 formed upon the front edges of the section 3. When the eccentric is rotated so as to withdraw it from engagement with these notches the intermediate section 3 may be vertically moved inside of the section 2 up to a position wherein the lip 15 engages with the eccentric. The section 3 cannot move beyond this position and hence the eccentric forms a stop limiting the upward movement of the section 3 and preventing its entire removal from the section 2. By this means it may be brought to the proper vertical position and then clamped by rotating the eccentric 16 and engaging the loop 19 with the lug 20, this lug being provided with an eye through which a wire pin, or other fastening device 21 may be passed. In order to support the locking pin which engages in the eyes of the lug 20 we provide the flexible connection to which the hooked pin 21 is attached, thus the hooked pin cannot be removed.

The uppermost section 4 is U-shaped in cross-section and fits snugly in the sides of the section 3 so as to have a sliding engagement with the section 3. The lower ends of the sides of the section 4 are formed with the upwardly extending oppositely placed slots 22 through which a transverse pin 23 passes, this pin being attached to the sides of the section 3. The slots 22 are slightly inclined downwardly and toward the rear of the section 4. As a consequence, when the section 4 is drawn upward so that the pin 23 is in the lower ends of the slots, the section 4 may be rotated upon the pin as upon a pivot, and the section 4 will fold inside of the section 3, as shown in Fig. 3. When, however, the section 4 is extended to its full height, and in alinement with the section 3 and is then forced directly downward, the inclined slots 22 will act to wedge the section 4 between the pin 23 and the rear face of the section 3, and thus the uppermost section 4 will be held in its vertical position until again drawn up and rotated.

Preferably, the section 4 is provided with a plurality of notches 24 for the purpose of holding wire cross-ties. The upper end of the section 4 is closed in by a plate 26 so as to strengthen the upper end and make the upper section entirely rigid. The upper end of the section 4 is also formed with an opening 27 whereby transverse bars may be connected to the upper section, such as are used to hold lumber and material of a like nature in position upon a flat car.

In practical use, as before stated, our improved car stake is attached to the side of the sill of the car. When not in use the stake is collapsed and turned down into a horizontal position parallel with the sill and rested upon the supporting hook $a$. When it is desired to turn the stake up, it is raised to a vertical position and the loop or bail 10 is forced down over the lug 9. The sections 3 and 4 may be left collapsed, or the section 3 may be raised, or all of the sections may be raised to their full height, as shown in Fig. 1. The section 3 is held in its adjusted position by means of the clamp or eccentric 16. The stake can be folded down out of the way either to the right or to the left, or it may be dropped to a right angle to the floor of the car when it is closed, and yet will clear the ground.

When not in use the stake is entirely out of the way and supported upon the hooked bracket or support $a$, as shown in Fig. 5.

Having thus described the invention what is claimed as new is:—

1. A car stake comprising a pivotally mounted lower section having means for locking the same in an adjusted position, a second stake slidably mounted within the first named stake, and an eccentric mounted on one of said sections and engaging with the other and locking said sections against movement in either direction with respect to each other.

2. A car stake comprising a pivotally mounted base-section, an upper section slidably mounted within the base-section, and an eccentric carried by the base-section and engaging the upper section for locking the upper section against movement in either direction, said eccentric forming a stop preventing the removal of the upper section from the base-section.

3. The combination with a car having a base-plate formed thereon provided with an upwardly projecting lug and one member of a ball and socket joint projecting from said base-plate, of a car stake, the lower end of which is provided with the other member of a ball and socket joint engageable with the first named member, and with a latch pivoted thereon and engageable with the upwardly projecting lug on the said base.

4. A car-stake comprising a lower section and an upper section telescopically engaged with each other, one section being provided with an eccentric mounted thereon and extending transversely across the same, the other section being provided with a series of notches in which said eccentric engages when it is turned, the eccentric being provided with a handle whereby it may be turned into and out of the path of movement of the notched section, said eccentric locking the notched section from movement in either direction and forcing the notched section into snug engagement with the section on which the eccentric is mounted.

5. A car stake including an upper hollow section, and an upper section telescoping into the lower section and formed with a plurality of notches on its front face, ears projecting from the upper end of the lower section, an eccentric mounted in said ears and engaging with said notches, an arm projecting from the eccentric and formed with a loop at one end, and an ear projecting from the lower face over which the loop engages to lock the arm in position.

6. A car stake including two sections, an upper and lower, the lower section being hollow to receive the upper section, and being formed with a transverse pin, the upper section at its lower end having oppositely disposed slots downwardly and rearwardly inclined through which said pin passes, whereby the upper section may have rotative movement upon the lower section, and also have a vertical locking movement.

7. A car stake including a hollow lower section having a latching device on its front, an intermediate section telescopically movable through the lower section and having a plurality of means with which the latching device engages to lock the intermediate section in various adjusted positions relative to the lower section, and an upper section pivotally connected to the upper end of the intermediate section, and means for holding the upper section in a vertical position.

8. The combination with a car, of a base formed upon the car and provided with an upwardly projecting lug, a ball projecting from said base, of a car stake including a lower hollow section, a socket carried upon the lower end of the hollow section and engaging said ball, a U-shaped intermediate section telescopic within the lower section and having a series of oppositely disposed notches upon its forward edges, an eccentric carried upon the lower section and engageable with said notches, an arm on said eccentric, means for locking the arm to hold the eccentric in its locking position, and a three-sided upper section fitting snugly within the intermediate section, and formed with downwardly and rearwardly inclined slots, a pin upon the upper end of the intermediate section passing through said slots, and a support mounted upon the side of the car to receive the stake when the same is turned to a horizontal position parallel to the car.

In testimony whereof we affix our signatures in presence of two witnesses.

FRANK E. ROLLINS. [L. S.]
ARVIN L. ROLLINS. [L. S.]

Witnesses:
G. A. Cameron,
E. T. Darling.

---

Copies of this patent may be obtained for five cents each, by addressing the "Commissioner of Patents, Washington, D. C."